United States Patent

Brander

[15] 3,651,428

[45] Mar. 21, 1972

[54] GRADUAL ON-OFF KEYING CIRCUIT FOR AN OSCILLATOR

[72] Inventor: Richard Brander, Cicero, Ill.

[73] Assignee: Beltone Electronics Corp.

[22] Filed: May 25, 1970

[21] Appl. No.: 40,115

[52] U.S. Cl. ............................331/173, 179/1 N, 181/0.5 G, 331/167, 331/183

[51] Int. Cl. ........................................H03b 3/00, H03b 5/08

[58] Field of Search ..................331/106, 167, 172, 173, 174, 331/182, 183; 179/1 N; 181/0.5 G

[56] References Cited

UNITED STATES PATENTS

| | | | |
|---|---|---|---|
| 2,089,781 | 8/1937 | Buschbeck | 331/173 X |
| 3,332,036 | 7/1967 | Kappenhagen et al. | 331/173 |

*Primary Examiner*—Roy Lake
*Assistant Examiner*—Siegfried H. Grimm
*Attorney*—Molinare, Allegretti, Newitt & Witcoff

[57] ABSTRACT

A diode network controls the amplitude of oscillation of an oscillator signal. A resistor and capacitor and series connected keying switch connectable to either one of two DC voltage sources function to vary the bias on the diodes gradually between a first and a second level so that the oscillator may be smoothly keyed on and off.

13 Claims, 11 Drawing Figures

INVENTOR.
RICHARD BRANDER
BY Molinare, Allegretti, Newitt, and Witcoff
ATTORNEYS INVENTOR.
RICHARD BRANDER
BY Molinare, Allegretti, Newitt, and Witcoff
ATTORNEYS

GRADUAL ON-OFF KEYING CIRCUIT FOR AN OSCILLATOR

BACKGROUND OF THE INVENTION

This invention relates generally to a keying circuit for an oscillator. One example in which such a keying circuit may be employed is an audiometer. The audiometer is an instrument employed for testing a person's hearing by supplying the person with signals of varying level and determining the lowest level at which the person perceives the signal.

In practice, for pure tone testing the test signal is delivered to the person through headphones, and to the headphones from a keyed variable frequency oscillator through a variable attenuator. A signal at a level determined by the setting of the variable attenuator is then supplied by keying on the oscillator and the patient whose hearing is to be tested is asked whether a signal has been detected. The signal is then terminated and a second signal of a different level is supplied. This process is repeated at different levels until the lowest level at which the person perceives the signal is determined.

In order to obtain a truly accurate determination of the patient's hearing range, the test signal must be completely eliminated when the oscillator is keyed off and the amplitude of the test signal delivered to the variable attenuator when the oscillator is keyed on must be accurately controlled. It is also important to control the rise and decay periods of the test signal to avoid transient noise signals which would be generated if the oscillator signal was suddenly keyed on and off. This is important since such a transient signal could create audible noise signals which would interfere with an accurate determination of the patient's hearing threshold.

Accordingly, it is desirable to provide a keying circuit for an oscillator which will key the oscillator on and off with smooth and controllable rise and decay periods. It is also desirable to prevent the generation of any signal during the time in which the oscillator is keyed off and to control the amplitude of the test signal of the oscillator while the signal is being delivered.

SUMMARY OF THE INVENTION

In a principal aspect, the present invention relates to a keying circuit for an oscillator which keys the oscillator signal on and off over smooth and controllable rise and decay periods, terminates oscillation completely at the end of the decay period, and regulates the amplitude of oscillation of the oscillator signal at a predetermined steady state level following the rise period after the oscillator has keyed on.

In a particular embodiment, the invention comprises a keying switch and a resistor capacitor network to gradually vary the bias of a diode network which in turn keys the oscillator signal on and off.

BRIEF DESCRIPTION OF THE DRAWINGS

There is shown in the attached drawing a presently preferred embodiment of the present invention, wherein like numerals refer to like elements and wherein:

FIG. 2 B is a graph showing the idealized current voltage characteristics of the semiconductor diodes $D_3$ employed in the present invention;

FIG. 4 B is a graph of the current time characteristics of the current injected into node 4 of the circuit shown in FIG. 1;

FIG. 4 C is a graph of the voltage time characteristics of the voltage $V_4$ at node 4 of the circuit shown in FIG. 1.

DESCRIPTION OF THE PREFERRED EMBODIMENT

Figure 1:
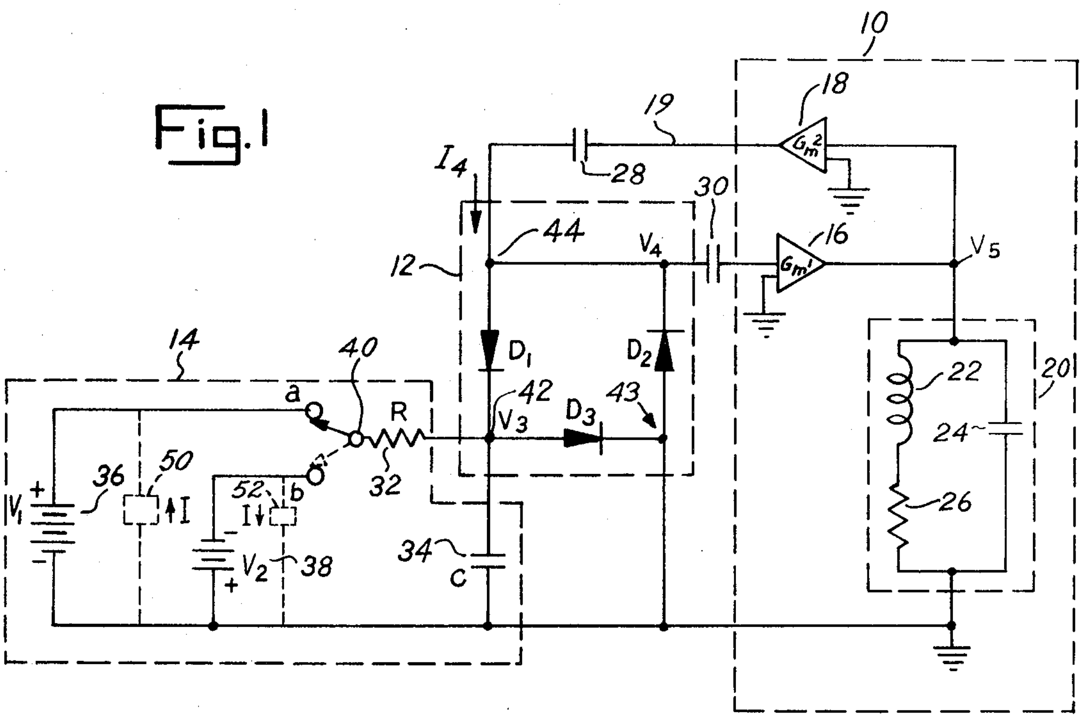
FIG. 1 is a schematic diagram of the oscillator and keying circuit of the present invention.

The circuit employing the principles of this invention is shown in FIG. 1. The basic components included in the schematic of FIG. 1 are an oscillator circuit 10, diode network 12 and keying switch and associated keying circuitry 14. The operation of this circuit will be described using simplified representations of some of its components. However, this adequately describes the basic operation of the circuit with real components.

The oscillator 10 includes idealized transconductance amplifiers 16 and 18 and a tank circuit 20. A feedback loop 19 is provided to control the output of oscillator 10 and the amplifier 18 is in series connection in the loop 19. The tank circuit 20 includes an inductor 22, capacitor 24, and resistor 26. The output frequency of the oscillator 10 may be controlled by tuning the tank circuit 20. The tank circuit 20 also has a filtering action which functions to reduce any distortion generated by the diode network 12. Blocking capacitors 28 and 30 function to block low frequency signals from the oscillator 10 while passing the tone frequency.

Figure 2A:
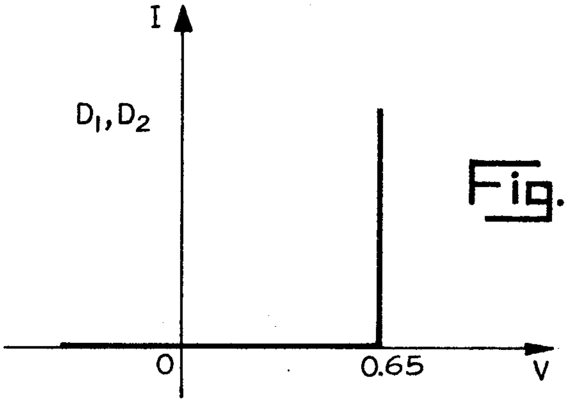
FIG. 2 A is a graph showing the idealized current voltage characteristics of the semiconductor diodes $D_1$ and $D_2$ employed in the present invention.
Figure 2B:
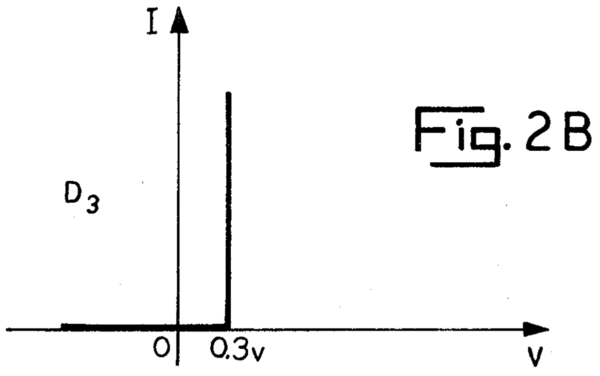

The diode network 12 and associated keying circuitry 14 are connected within the feedback loop 19 of the oscillator 10 to allow the oscillator 10 to be completely shut off when the oscillator 10 is keyed off. The diode network 12 includes diodes $D_1$, $D_2$ and $D_3$ connected as shown in FIG. 1. The idealized current-voltage characteristic of diodes $D_1$ and $D_2$ is shown in FIG. 2 A. These diodes are silicon type semiconductors having a relatively high voltage drop across them when in the conducting mode. The idealized current voltage characteristic of diode $D_3$ is shown in FIG. 2B. Diode $D_3$ is a germanium type semiconductor having a forward voltage drop across it somewhat lower than the forward voltage drop of diodes $D_1$ and $D_2$.

The current voltage characteristics of diodes $D_1$ and $D_2$ show that these diodes are relatively nonconducting until a forward voltage of 0.65 volts is applied to each of them. On the other hand, diode $D_3$ is relatively nonconducting until a forward bias voltage of 0.3 volts is applied to it.

As may be seen in FIG. 1, the diode network 12 is connected in shunt across the feedback loop 19. The network 12 is preferably connected at a point of high impedance in the loop 19 so that the high impedance of the loop 19 is substantially greater than the effective forward impedance of the diodes $D_1$, $D_2$ and $D_3$ and so that the diode network 12 does not substantially load the tank circuit 20. An impedance in the range of about 1,000 ohms or greater is desirable for the impedance point in the loop 19.

The bias control circuit 14 includes a resistor 32, a capacitor 34, a first voltage source 36 having a voltage $V_1$, a second voltage source 38 having an oppositely poled voltage $V_2$ and a single pole, double throw switch 40 movable into contact with voltage source 36 or 38. The operation of the keying switch 40 determines the voltage $V_3$ at node 42 between the resistor 32 and the capacitor 34. As will be further explained, voltage $V_3$ at node 42 controls the signal level from the oscillator 10.

Figures 3, 4B, 7, 8:
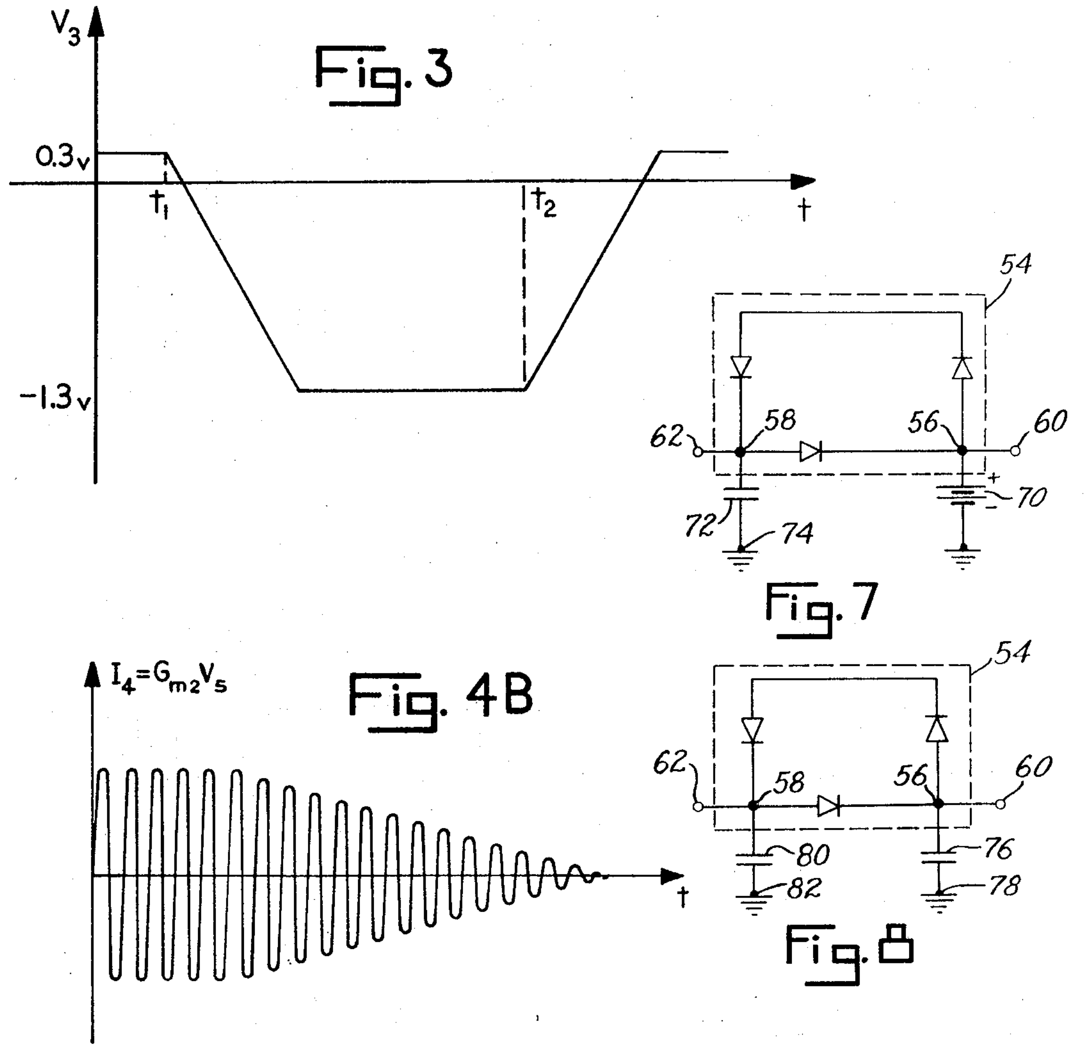
FIG. 3 is a graph of the voltage time characteristics of a tone control voltage $V_3$.

Referring to FIG. 3, from time $t=0$ to time $t=t_1$, the single pole double throw keying switch 40 is in contact with the positively poled voltage source 36. In this mode, the diode $D_3$ is forward biased and conducting. As has been already stated, when diode $D_3$ is in the conducting mode, there is a forward voltage drop of 0.3 volts across the diode $D_3$. Thus, the voltage $V_3$ at node 42 is 0.3 volts from time $t=0$ to time $t=t_1$.

At time $t=t_1$, the keying switch 40 is displaced into contact with negatively poled voltage source 38. At that time, the voltage which has been stored in the capacitor 34 discharges through the resistor 32 and voltage source 38, causing the voltage $V_3$ to decay at a smooth and controlled time rate of change of approximately equal to $V_2/RC$. This voltage drop continues until the voltage $V_3$ reaches −1.3 volts. At this time, the diodes $D_1$ and $D_2$ are forward biased and hold the voltage $V_3$ at the sum of their forward voltage drops, −1.3 volts. At time $t=t_2$, the keying switch 40 is displaced into contact with positively poled voltage source 36. At this time, the capacitor 34 charges through the resistor 32 and voltage source 36, causing the voltage $V_3$ to increase with a time rate of change of approximately $V_1/RC$. When the voltage $V_3$ reaches the level of 0.3 volts, the diode $D_3$ is again placed in the conducting mode and holds the voltage $V_3$ to its forward voltage drop of 0.3 volts.

Figure 4C:
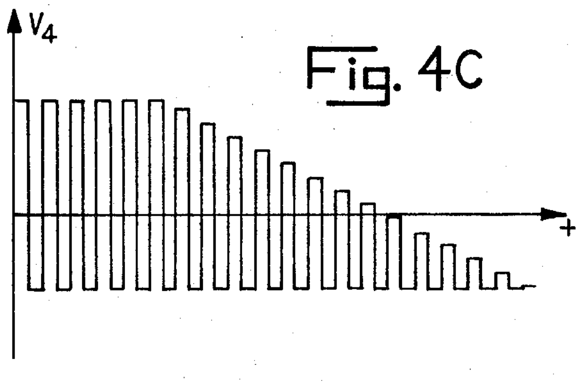
FIG. 4 A is a graph of the current voltage characteristics at node 4 of the keying circuit shown in FIG. 1.
Figure 4A:
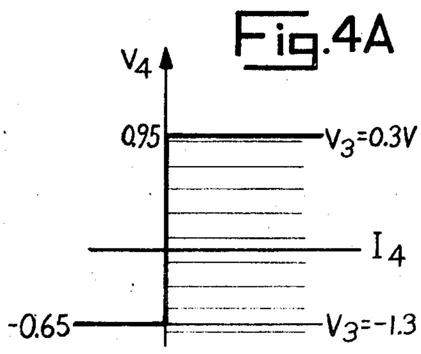

The effect of the voltage $V_3$ on the output signal of the oscillator 10 may be better understood by reference to FIGS. 4 A–C. The current voltage characteristics at node 44 have been plotted for varying values of $V_3$ from 0.3 to −1.3 volts. A current $I_4$ shown in FIG. 4 B is injected into the node 44 at the tone frequency from the oscillator 10. The current $I_4$ generates a voltage $V_4$ having an amplitude controlled by the voltage-current characteristics shown in FIG. 4 A. When the keying switch 40 is connected to the positively poled voltage source 36, the keying circuit is in the "on" mode. This mode lasts from $t=0$ to $t=t_1$, during which time the amplitude of the voltage $V_4$ oscillates between −0.65 volts and +0.95 volts.

When the current $I_4$ is positive the diodes $D_1$ and $D_3$ are forward biased and the voltage $V_4$ at node 44 is held at a maximum of +0.95 volts, the sum of the forward voltage drops of diodes $D_1$ and $D_3$. When the current $I_4$ is negative, diode $D_2$ is forward biased and holds the voltage $V_4$ at −0.65 volts, the forward voltage drop of diode $D_2$.

Voltage $V_4$ in turn controls voltage $V_5$ which is given by the equation $V_5=V_4G_{m1}Z(f)$ where $Z(f)$ is the impedance of the tank circuit 20. As may be seen from the graph of FIG. 4 C, the voltage $V_4$ is a clipped square wave type of signal. Accordingly, the signal presents an output at the fundamental tuned resonant frequency and at higher harmonics of that frequency, the higher harmonics of the voltage $V_4$ are attenuated and only a sinusoidal signal at the resonant frequency is present in the output voltage $V_5$. The value of the current $I_4$ is given by the equation $G_{m2}V_5$ and accordingly its value in terms of $V_4$ is, $I_4=G_{m1}G_{m2}Z(f)V_4$.

As has been explained, at time $t=t_1$, the keying switch 40 is placed into contact with the negatively poled voltage source 38, causing the capacitor 34 to discharge through the resistor 32 and the voltage source 38. In this mode, the voltage $V_3$ decays smoothly from +0.3 volts to −1.3 volts at a controlled time rate of change. During this time, the peak to peak amplitude of the voltage $V_4$ decreases from 1.6 volts to 0. When the peak to peak amplitude of the voltage $V_4$ reaches 0, the oscillator 10 no longer oscillates and no output signal $V_5$ is generated. During this time, the oscillator 10 is completely turned off.

The oscillator 10 is turned on at time $t=t_2$ by displacing the keying switch 40 into contact with the voltage source 36. At this time, the voltage $V_3$ increases gradually from −1.3 volts to +0.3 volts and the peak to peak amplitude of voltage $V_4$ increases gradually from 0 to 1.6 volts where it remains constant at a steady state level.

From the foregoing it should be appreciated that the keying circuit of this invention provides an oscillator having smooth and controllable rise and decay periods, the decay period being approximately equal to $V_2/RC$ and the rise period being approximately equal to $V_1/RC$. Thus the rise and decay periods may be varied by controlling the value of the voltage sources 36 and 38 and of the resistor 32 and capacitor 34.

It should also be appreciated that when the oscillator 10 has been turned off in response to actuation by the keying switch 40 into contact with negatively poled voltage source 38, no output voltage $V_5$ is present at the output of the oscillator 10.

A further advantage of the present invention is that the amplitude of the output signal of the oscillator 10, when keyed on, is controlled by the forward voltage drops of the diodes $D_1$, $D_2$ and $D_3$ of the diode network 12. In the present preferred embodiment, the diodes $D_1$, $D_2$ and $D_3$ are semiconductor diodes having known stable forward voltage drops. Thus, the amplitude of the output signal from the oscillator 10, when keyed on, is accurately and stably controlled by the circuit of the present invention.

In the foregoing, a present preferred embodiment of this invention has been described as illustrative of one application of the principles of this invention. Some alternative applications of the present invention are described as follows.

The oscillator 10 may be keyed electronically with a bistable keying voltage source (not shown) which may be substituted for the switch 40 and the voltage sources 36 and 38 of FIG. 1. A range of values for the voltage sources 36 and 38 or for the bistable keying voltage source (not shown) may be accommodated by connecting node 43 to a DC voltage source (not shown) with the DC voltage source (not shown) connected between the node 43 and ground. The value of the DC voltage source (not shown) must be selected to have a value between the maximum and minimum values of the keying voltage $V_3$ at node 42. In this application, the voltage sources 36 and 38 need not be oppositely poled.

It is of course understood that the keying voltage sources 36 and 38 and resistor 32 may be replaced by keying current sources 50 and 52 shown in outline form in FIG. 1. The diode network 12 may be symmetrically driven at node 42 and 43 to eliminate the DC voltage level shift of $V_4$ indicated in FIG. 4 C. The transconductance amplifier 18 may be replaced by a series connected resistor and coil (not shown) inductively coupled to the inductor 22 of the tank circuit 20.

Referring to FIGS. 5–8, there are shown alternative preferred embodiments of a portion of the keying circuit of this invention. In each of these Figures, a diode network 54, identical to the diode network 12 of FIG. 1 is shown. Each of the diode networks 54 has a first control node 56, a second control node 58, a first input terminal 60 and a second input terminal 62.

Figure 5:
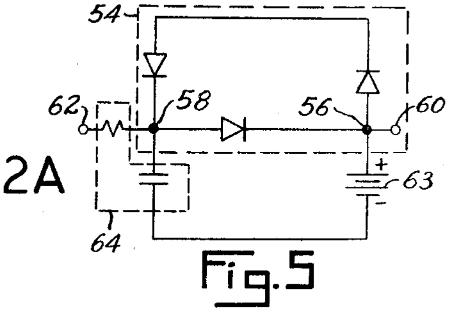
FIGS. 5–8 are schematic diagrams of alternative embodiments of a portion of the keying circuit of the present invention.
Figure 6:
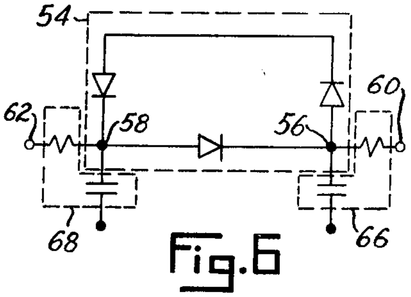

In FIG. 5, a DC voltage source 63 is connected to the first control node 56 and a resistor capacitor network 64 is connected between the second input terminal 62 and second control node 58. In FIG. 6, a first resistor capacitor circuit 66 is connected between first input terminal 60 and first control node 56 and a second resistor capacitor circuit 68 is connected between second input terminal 62 and second control node 58. In FIG. 7, a DC voltage source 70 is connected to first control node 56 and second control node 58 is connected to second input terminal 62. Also, a capacitor 72 is connected between the input terminals 62 and a ground terminal 74. In FIG. 8, first control node 56 is directly connected to first input terminal 60 and second control node 58 is directly connected to second input terminal 62. Also, a first shunt capacitor 76 is connected directly between the first input terminal 60 and a ground terminal 78 and a second shunt capacitor 80 is connected between the second input terminal 62 and a second ground terminal 82.

It is to be understood that the present embodiments of this invention described above are merely illustrative of some applications of the principles of this invention. A variety of other arrangements well-known in the art could be similarly employed to instrument this invention without departing from the true spirit and scope thereof.

What is claimed is:

1. A keying circuit for controlling the output signal of an oscillator comprising, in combination,
   means for electronically controlling the rise and the decay periods of said signal to predetermined times,
   means for electronically terminating oscillation completely after said decay period has elapsed, and
   means incorporated in said keying circuit for electronically regulating the amplitude of oscillation of said signal to a predetermined steady state level after said rise period has elapsed.

2. A keying circuit for controlling the output signal of an oscillator having a feedback loop comprising, in combination,
   diode means within the feedback loop of said oscillator for controlling the amplitude of said output signal,
   a keying switch displaceable into contact with a first DC voltage source and a second DC voltage source, and a series resistor and shunt capacitor network connected between said keying switch and said diode means for gradually varying the bias level of said diode means in response to abrupt voltage changes from said keying switch such that said oscillator may be gradually keyed on and off.

3. The circuit of claim 2 wherein said diode means comprises a first diode, a second diode having its cathode connected to the anode of said first diode, and a third diode having its cathode connected to the anode of said second diode and its anode connected to the cathode of said first diode.

4. The circuit of claim 3 wherein said first and second diodes are silicon diodes and wherein said third diode is a germanium diode.

5. The circuit of claim 2 wherein said keying switch is a single pole double throw switch.

6. A keying circuit for controlling the output signal of an oscillator having a feedback loop comprising, in combination, diode means within the feedback loop of said oscillator for controlling the amplitude of oscillation of said signal and, means for gradually varying the bias of said diode means such that the amplitude of said signal may be smoothly keyed on and off between a predetermined maximum value and zero.

7. The circuit of claim 6 wherein said means for gradually varying the bias of said diode means includes a keying switch connected to an input terminal and displaceable into contact with a first DC voltage source and a second DC voltage source, and a resistor-capacitor circuit connected between said input terminal and said diode means such that abrupt changes in voltage at said input terminal produce gradually varying changes in the bias of said diode means.

8. The circuit of claim 6 wherein said means for gradually varying the bias of said diode means includes a keying switch connected to an input terminal, said input terminal connected to said diode means, said switch displaceable into contact with a first DC current source and a second DC current source and a shunt capacitor connected between said input terminal and a ground terminal such that abrupt changes in current into said input terminal produce gradually varying changes in the bias of said diode means.

9. A keying circuit for controlling the output of an oscillator having a feedback loop comprising, in combination, a diode network connected to a high impedance point in the feedback loop of said oscillator, said diode network having a first control node and a second control node such that said oscillator may be keyed on and off in response to bias level changes at said control nodes.

10. The circuit of claim 9 wherein said first control node is connected to a DC voltage source and including a resistor capacitor network connected between an input terminal and said second control node such that abrupt changes in voltage at said input terminal produce gradually varying changes in the bias level at said second control node.

11. The circuit of claim 9 including a first resistor capacitor circuit connected between a first input terminal and said first control node and a second resistor capacitor circuit connected between a second input terminal and said second control node such that abrupt changes in the voltage at said first and second input terminals produce gradually varying changes in the voltage at said first and second control nodes respectively.

12. The circuit of claim 9 wherein said first control node is connected to a DC voltage source and said second control node is connected to an input terminal and including a capacitor connected between said input terminal and a ground terminal such that abrupt changes in current flowing into said input terminal produce gradually varying changes in the bias of said control node.

13. The circuit of claim 9 wherein said first control node is directly connected to a first input terminal and said second control node is directly connected to a second input terminal and including a first capacitor connected in shunt between said first input terminal and a ground terminal and a second shunt capacitor connected between said second input terminal and a second ground terminal such that abrupt changes in the current flowing into said first and second input terminals produce gradually varying changes in the bias at said first and second control nodes, respectively.

* * * * *